US 9,508,050 B2

(12) United States Patent
Patil

(10) Patent No.: US 9,508,050 B2
(45) Date of Patent: *Nov. 29, 2016

(54) EXECUTING A BUSINESS PROCESS IN A FRAMEWORK

(71) Applicant: SAP SE, Walldorf (DE)

(72) Inventor: Chatur B Patil, Wiesloch (DE)

(73) Assignee: SAP SE, Walldorf (DE)

( * ) Notice: Subject to any disclaimer, the term of this patent is extended or adjusted under 35 U.S.C. 154(b) by 39 days.

This patent is subject to a terminal disclaimer.

(21) Appl. No.: 14/097,241

(22) Filed: Dec. 5, 2013

(65) Prior Publication Data

US 2014/0095267 A1 Apr. 3, 2014

Related U.S. Application Data

(63) Continuation of application No. 12/973,873, filed on Dec. 20, 2010, now Pat. No. 8,639,729.

(51) Int. Cl.
*G06Q 10/00* (2012.01)
*G06F 17/30* (2006.01)
*G06Q 10/06* (2012.01)

(52) U.S. Cl.
CPC ..... *G06Q 10/0637* (2013.01); *G06F 17/30345* (2013.01); *G06F 17/30867* (2013.01); *G06Q 10/06* (2013.01)

(58) Field of Classification Search
CPC .............. G06Q 10/0637; G06F 17/30867; G07F 17/30345

See application file for complete search history.

(56) References Cited

U.S. PATENT DOCUMENTS

| | | | |
|---|---|---|---|
| 6,868,413 B1* | 3/2005 | Grindrod | G06N 99/005 706/59 |
| 2002/0147624 A1 | 10/2002 | Yoshida et al. | |
| 2003/0090514 A1* | 5/2003 | Cole | G06Q 10/10 715/744 |
| 2003/0187676 A1* | 10/2003 | Hack | G06Q 99/00 705/348 |
| 2004/0267595 A1* | 12/2004 | Woodings et al. | 705/9 |
| 2005/0102284 A1* | 5/2005 | Srinivasan | G06F 17/30398 |
| 2009/0024637 A1 | 1/2009 | Krishna et al. | |
| 2012/0005647 A1 | 1/2012 | Dolby et al. | |
| 2012/0053970 A1* | 3/2012 | Bhamidipaty | G06Q 10/063 705/7.11 |

* cited by examiner

*Primary Examiner* — Alexey Shmatov

(57) ABSTRACT

Various embodiments of systems and methods for executing a customized business process in a business process framework are described herein. A user selection of a solution type corresponding to a business process is received from a user interface. In response to the user selection, a query is executed to retrieve application types and corresponding sub-application types from a business logic stored in a database. Configurable attributes are generated based upon the application types and the corresponding sub-application types. Based upon the application types, the sub-application types and the configurable attributes, the business process is customized to create a customized business process. Based upon a configuration information, a user input to the customized business process is captured from the user interface. The user input is validated by comparing the user input with the business logic. The customized business process that is validated is further executed in the business process framework.

20 Claims, 7 Drawing Sheets

EXECUTING A BUSINESS PROCESS IN A FRAMEWORK

FIELD

Embodiments generally relate to computer systems, and more particularly to methods and systems for executing a customized business process in a business process framework.

BACKGROUND

Enterprise content management generally relates to managing content involving digital data that may be dependent on business processes influenced by attributes such as industry, geography, lines of business, customers, product lines and the like. For instance, a multinational company having employees throughout the world and having a product portfolio that addresses multiple employee-solutions, has to provide documentation which supports easy generation of country, industry and language specific content. The content may be marketing documents, presentations, sales pitches, cost-benefit calculations, forms, tables, files and the like. While much of the content may need to be customized to the business process, there is a lot of redundant content that is repeated for each of the processes. There is a need for methods and systems for reusing as much of the available content as possible and for developing the content that is specific to the business process in order to minimize redundancy of development and maintenance efforts.

SUMMARY

Various embodiments of systems and methods for configuring a framework to execute a business process are described herein. To customize the business process, a user selection of a solution type corresponding to a business process is received from a user interface. In response to the user selection, a query is executed to retrieve application types and corresponding sub-application types from a business logic associated with the business process. In an embodiment, the business logic is stored in a database. Configurable attributes for the solution type are generated based upon the application types and the corresponding sub-application types. The business process is customized based upon the application types, the corresponding sub-application types and the configurable attributes, to create a customized business process in a business process framework. Based upon a configuration information associated with the configurable attributes, a user input is captured from the user interface for the customized business process. The configuration information associated with the configurable attributes is stored in the business logic. The user input to the customized business process is validated to execute the customized business process in the business process framework. The validation is carried out by comparing the user input to the customized business process with the business logic associated with the business process. The customized business process that is validated is further executed in the business process framework.

In an embodiment, the validation process further includes displaying an error message on the user interface. The error message may originate due to an invalid user selection, an invalid user input to the attribute, an invalid file attached with the user input, or the like. The validity of the above user actions is determined based upon the business logic. In response to such error messages, error-correction information is generated based upon the business process. Metadata of the business process is associated with the business logic and is stored in a database along with the business logic and the business process. The metadata is use to determine the error messages and to generate the error-correction information. In an embodiment, the error messages are displayed on the user interface based upon a role of the user. Each user has an associated role that allows the user to perform certain operations on the business process. Each user may also be associated with a set of user actions for the customized business process; and based upon the validation, such user actions are sent to the user for execution. In another embodiment, the configurable attributes are configured to send an alert to the user to perform the associated user action.

In an embodiment, the user input to the customized business process, and the user actions are stored as transaction data in the database. The database is updated with the transaction data based upon the execution of the business process. The transaction data may be tracked at specific instances of the business process to provide specific status updates at the respective instances. In an embodiment, the customized business process may be invoked to update the transaction data in the database.

In an embodiment, the application types and the corresponding sub-application types are mapped based upon a hierarchy in the business process. The hierarchy in the business process may depend upon a priority of the application types and the corresponding sub-application types. The hierarchy includes a set of multiple levels of the application types and the corresponding sub-application types. Each level in the hierarchy may be associated with a set of users and corresponding user actions. A notification may be sent from the business logic to include the users at different levels in the hierarchy. The user actions may also be requested at different levels in the hierarchy.

In an embodiment, the user input to the customized business process may include configuring a set of tasks that have to be performed on the applications and sub-applications, authorizations for validating the customized business processes, fields and field-types for displaying on the user interface, field actions for the fields, visibility statuses, validity statuses and accessibility options.

In another embodiment, the business logic is configured to define generic application definitions and associated generic application types and sub-application types, dynamic screen rendering fields, associated generic application screen rendering fields, a set of values for the dynamic screen rendering fields and the associated generic application screen rendering fields. The business logic is also configured to maintain a set of generic configurable attributes for the generic application types and the corresponding generic sub-application types, along with a set of generic tasks, generic authorizations, generic fields and corresponding generic field types, generic field-actions, generic validity statuses, generic visibility statuses, and generic accessibilities. All of the contents of the business logic act as metadata to the corresponding business process.

These and other benefits and features of embodiments will be apparent upon consideration of the following detailed description of preferred embodiments thereof, presented in connection with the following drawings.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for systems and methods for configuring a framework to execute a business process are described herein. A business process may be described as an arrangement of a collection of inter-dependent actions with a purpose of achieving an intended result. Business processes may be independently operational or supportive of other processes. A customized business process may be described as a business process that may be modified under considerations to produce an instance-specific result. Thus, the customized business process includes business information that can be used in a particular situation of the business process, having configurable attributes associated with that situation. A business process framework may be described as an adaptable collection of objects for an associated business process, which is responsible for configuring, monitoring and executing the business process.

For instance, to execute a business process of 'applying for a leave of absence' for 'user A' in an organization, the business process may be customized based upon a number of eligible leaves of absence, a set of different types of eligible leaves of absence, a validity of the eligible leaves of absence and the like. To execute such a customized business process of 'applying for a leave of absence', a 'leave-request framework' may be developed for 'user A' based upon a configuration information associated with 'user A' and the business process of 'applying for a leave of absence'.

In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
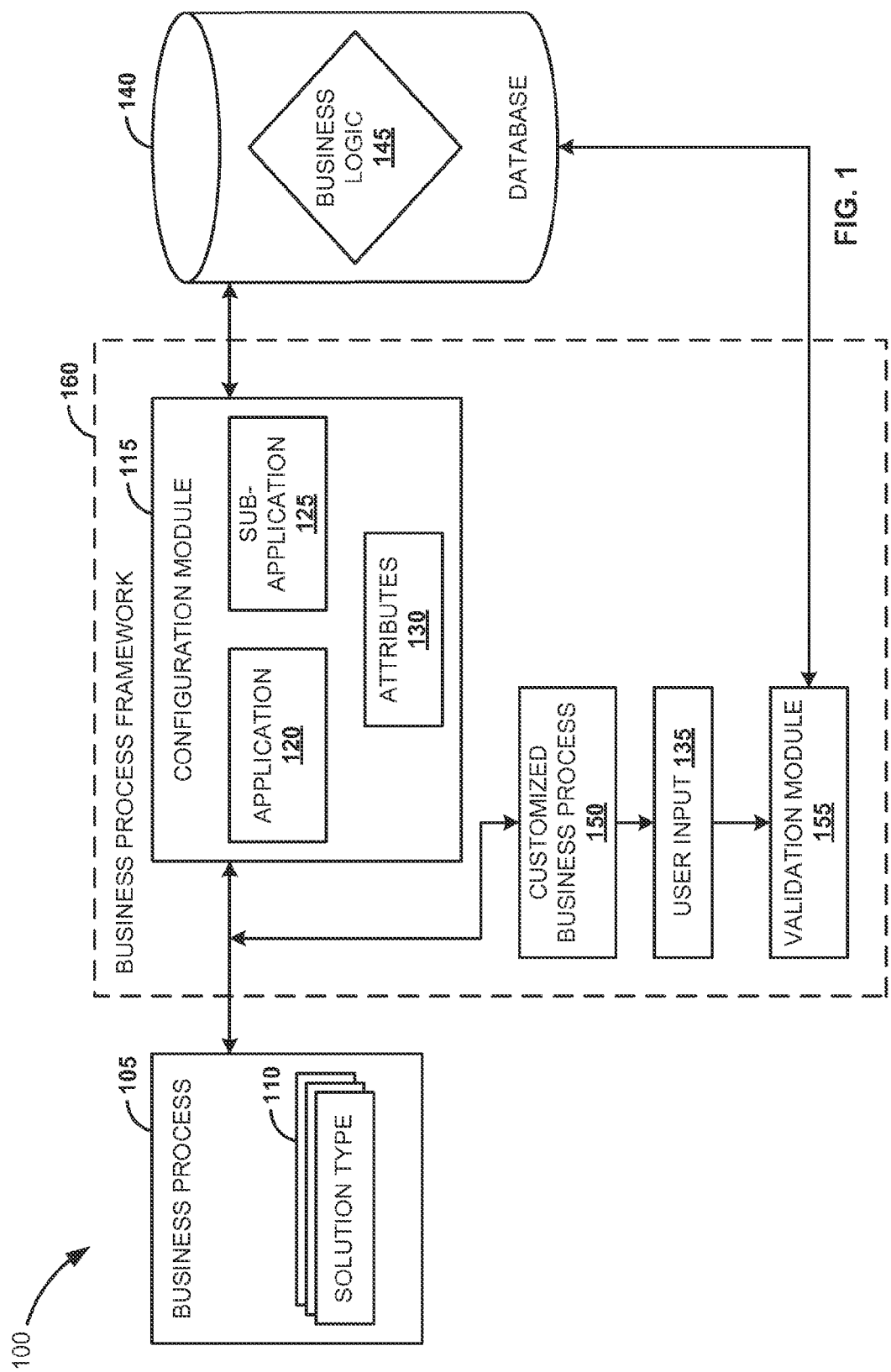
FIG. 1 is a block diagram illustrating an overview of a system for executing a customized business process in a business process framework, according to an embodiment.

FIG. 1 is a block diagram illustrating an overview of a system for executing a customized business process in a business process framework, according to an embodiment. Block diagram 100 includes business process 105, user selected solution type 110, configuration module 115, application type 120, sub-application type 125, configurable attributes 130, user input 135, database 140, business logic 145, customized business process 150, and validation module 155. With reference to the above example, 'applying for a leave of absence' represents business process 105; and a set of different types of eligible leaves of absence represents solution type 110 available for 'user A' and for business process of 'applying for a leave of absence' 105.

Business process 105 includes an arrangement of a collection of inter-dependent solution types (for e.g., solution type 110), with a purpose of achieving an intended result. In an embodiment, business process 105 is stored in database 140. Metadata of such business processes 105 is also stored in database 140. The metadata of business process 105 includes a set of solution types (for e.g., 110), a set of associated application types (for e.g., 120) and a set of corresponding sub-application types (for e.g., 125). The metadata also includes a set of configurable attributes (for e.g., 130) associated with the application types 120 and the corresponding sub-application types 125. The metadata includes configuration information associated with the configurable attributes. The metadata may include many other details about business process 105. A solution type may be described as a set of business solutions provided by an associated business process, where each solution type defines a business task in a comprehensive manner. Solution type 110 is described as a set of business solutions provided by associated business process 105. Business process 105 stores many such solution types 110, each defining a business task.

To customize business process 105, a user selection of solution type 110 is received from a user interface. A user interface may be described as a platform where a user interacts with the modules of a system (for e.g., business process 105, configuration module 115, and validation module 155). A user may choose solution type 110 from a list of solution types associated with business process 105. In response to the user selection of solution type 110, configuration module 115 executes a query in database 140 to retrieve application types 120 and corresponding sub-application types 125 from business logic 145 associated with business process 105.

Database 140 is configured to store metadata of the business process 105, including solution type 110, application types 120 and corresponding sub-application types 125 associated with business process 105, and configuration information of configurable attributes 130 that are necessary for executing business process 105. The configuration information of configurable attributes 130 further include actions to be performed on application types 120 and corresponding sub-application types 125, authorizations for validating business process 105, fields and field types for displaying on the user interface, field-actions for the fields, validity and visibility of the fields, accessibilities for the applications types 120 and the sub-application types 125 and the like.

Business logic 145 associated with business process 105 is also stored in database 140. Business logic 145 includes a set of functional rules associated with business process 105 based upon which the metadata of business process 105 is exchanged between database 140 and a user interface. Business logic 145 illustrates functional rules for the collection of objects present in a business process framework 160. Business logic 145 regulates the interaction between application types 120, sub-application types 125, configurable attributes 130, solution types 110, the user interface, user inputs 135 to the user interface and the like. Business logic 145 implements methods by which the contents of the business logic 145 and the associated data in database 140 have to be accessed and updated. Business logic 145 also represents functional rules associated with one or more workflows involving business processes 105. Business logic 145 maintains the processes involved in workflows, data management of the workflows, user actions required at different stages, users' interactions with business process 105, and the like. Business logic 145 stores configuration information associated with the configurable attributes. The configuration information may include an information associated with the configurable attributes, that allows the configurable attributes to be configured in an intended manner.

An application type may be described as a set of available features for a solution type, where each application type defines a business task associated with the solution type. A sub-application type may be described as a set of available features for a corresponding application type, where each sub-application type defines a sub-task associated with the application type. Application type 120 provides a set of available features for solution type 110. Sub-application type 125 provides a set of available features for a selected feature of application type 120. For instance, a business process of 'applying for a leave of absence' in an organization includes a set of solution types 'leaves of absence in USA', 'leaves of absence in UK', 'leaves of absence in Australia' and the like.

Based upon a user's properties (for e.g., geographic location, user's eligibility, user's role in the organization) a set of solution types displays for a selected business process. If the user selection of a solution type is 'leaves of absence in Australia', configuration module 115 executes a query in database 140 to retrieve a set of application types 'illness leave', 'casual leave', 'examination leave' and the like along with corresponding set of sub-application types 'anticipate leave', 'adjust against loss of pay' 'adjust against compensated day' and the like. In an embodiment, the sub-application types may exist in multiple levels, where a first level sub-application type invokes a second level sub-application type. For instance, for a sub-application type of 'adjust against compensated day', a second level sub-application type of 'adjust against working on weekend', 'adjust against working on holiday' and the like may be invoked.

In an embodiment, application types 120 and corresponding sub-application types 125 are mapped based upon a hierarchy in business process 105. The hierarchy in business process 105 may depend upon a priority of application types 120 and corresponding sub-application types 125. For instance, a first application having a first sub-application and a second sub-application is at a higher level when compared to a second application having a third sub-application. There may be a need for the first application and the corresponding sub-applications to be executed prior to the second sub-application and the corresponding sub-applications. The mapping is done based upon a priority of occurrence of application types 120 and corresponding sub-application types 125. The hierarchy includes a set of multiple levels of application types 120 and corresponding sub-application types 125. Each level in the hierarchy may be associated with a set of users and corresponding user actions. A notification may be sent from business logic 145 to include the users at different levels in the hierarchy. The user actions may also be requested at different levels in the hierarchy.

Based upon the application types 120 and the corresponding sub-application types 125, configuration module 115 generates one or more configurable attributes 130 for the solution type 110. Configuration module 115 may generate configurable attributes 130 based upon business logic 145 in database 140. A configurable attribute defines a set of configurable parameters for a business entity, where the parameters are properties or values of the business entity. Configurable attributes 130 are associated with metadata of a business entity, the metadata of the business entity includes the business information of the entity, the configurable attributes 130 describe the properties or values of the business information. Configurable attribute 130 for solution type 110 may include configuring a set of tasks that have to be performed on the applications 120 and corresponding sub-applications 125, authorizations for validating the customized business processes 150, fields and field-types for displaying on the user interface, field actions for the fields, visibility statuses, validity statuses and accessibility options. Configurable attribute 130 is associated with the configuration describing the manner in which the configurable attribute 130 is configured. For instance, a configurable attribute 130 that includes a set of tasks may have configuration that describe the manner in which the tasks have to be performed.

Based upon the application types, the corresponding sub-application types and the configurable attributes, business process 150 is customized to create customized business process 150. The customized business process is created in business process framework 160. Customized business process 150 thus includes user selected solution type 110, associated application types 120 and corresponding sub-application types 125, associated configurable attributes 130, along with the functional rules defined by business logic 145 for business process 105.

User input 135 to customized business process 150 is captured from the user interface. User input may include assigning one or more tasks that have to be performed on application types 120 and corresponding sub-application types 125, assigning one or more authorizations for validating business process 105, selecting one or more fields and field types for displaying on the user interface, assigning field actions for the fields, assigning visibility statuses for the actions, assigning validity statuses and accessibility options, and the like. The fields and field types that are configured to accept user input may include a drop down menu, a checkbox, a text box, a value set, a hyper link, and the like. The user input to these fields may include selecting an option from a list of options in a drop down menu, making a selection in a checkbox, entering alpha-numeric input in a text box, clicking on a hyper link, and the like. In an embodiment, a field type may include a multiple-field table. A multiple-field table may be described as a table that includes a set of rows for different instances of the application types and corresponding sub-application types.

In an embodiment, the user input 135 and the user actions are stored as transaction data in the database 140. The database 140 is updated with the transaction data based upon the execution of the business process 105. The transaction data may be tracked at specific instances of the business process 105 to provide specific status updates at the respective instances. In an embodiment, the customized business process 150 may be invoked to update the corresponding transaction data in the database 140.

User input 135 to customized business process 150 is validated to configure customized business process 150. The validation of user input 135 to customized business process 150 is determined by comparing user input 135 with business logic 145 of business process 105. Based upon a result of this comparison, user input 135 to customized business process 150 is validated. The result of comparison may be described as the information discovered during the process, including a successful-comparison result if user input 135 to customized business process 150 matches the details in business logic 145 and an error message if the user input to customized business process 150 does not match the details in business logic 145.

In an embodiment, the error message may originate due to an invalid user selection, an invalid user input to the attribute, an invalid file attached with the user input, or the like. The validity of the user actions may be determined based upon business logic 145. In response to such error messages, error-correction information is generated based upon business process 105. The metadata of business process 105 is use to determine the error messages and to generate the error-correction information. In an embodiment, the error messages are displayed on the user interface based upon a role of the user. Each user has an associated role that allows the user to perform certain operations on the business process 105. For instance, an error-correction related to a 'remuneration of an employee' may be displayed only to a user with a role of a 'manager' and may not be available to a user with a role of a 'team member'. A 'user X' may be assigned a role of an approver that allows the 'user X' to approve certain requests on the business process. A 'user Y' may be assigned a role of an employee that allows the 'user Y' to request certain requests on the business process.

Each user may also be associated with a set of user actions for the customized business process 150, and based upon the validation of the user input, such user actions are sent to the user for execution. For instance, a user with a role of a 'manager' may have an 'edit' action available to perform on customized business process 150, and a user with a role of a 'team member' may have a 'display' action available to perform on customized business process 150. The user with the role of a 'manager' may validate user input 135 to customized business object 150 based upon the error message by performing an 'edit' on customized business process 150. In another embodiment, the configurable attributes 130 are configured to send an alert to the user to perform the associated user action. The alert may be a generated at regular intervals to remind the user for performing the action. The alert may be periodic, appearing in the user's mail-box on a specific day. The alert may also be associated with a validity period before which the action specified by the alert has to be performed. Some of the many user actions include an approval user action, a rejection user action, a modification user action, a validation user action, an invalidation user action and the like.

Based upon the error-correction information, configurable attributes 130 may be reconfigured to customize the business process 105. User input 135 to customized business process 150 is validated by comparing user input 135 to business logic 145. Customized business process 150 is further executed in the business process framework 160. In an embodiment, customized business process 150 is invoked to update the corresponding transaction data in the database 140.

In an embodiment, business logic 145 is configured to define generic application definitions and associated generic application types and generic sub-application types. Business logic 145 is also configured to define dynamic screen rendering fields, associated generic application screen rendering fields, a set of values for the dynamic screen rendering fields and the associated generic application screen rendering fields. The generic elements listed above are a part of a generic application server that stores the user inputs, user selection, retrieved application types, sub-application types, generated configurable attributes and the like. The generic application server may include a generic table that stores all properties related to the generic elements. The generic application server is also responsible for maintaining a group of available business processes and the associated solution types for the available business process. The generic application server may also include metadata of the business processes and the associated solution types.

Generic application definition may be described as a generic element associated with the generic application server that stores a list of all available solution types and their association with one or more respective business processes. Once a user chooses a solution type related to a business process, a generic table in the generic element server is created and updated with the solution type. Generic application types and corresponding generic sub-application types may be described as the generic elements that store in the generic table, a list of all available application types, corresponding sub-application types, their hierarchy, their levels of priorities, alert information, and all other details associated with the application types and corresponding sub-application types. When a query is invoked to retrieve a set of application types and corresponding set of sub-application types based upon a solution type selected by a user, the generic table for the respective business process and the selected solution type is identified. Based upon the generic application types and corresponding generic sub-application types available in the table, the application types and corresponding sub-application types associated with the selected solution types are retrieved on the user interface.

Dynamic screen rendering fields may be described as a set of data fields that are invoked to be displayed in the user interface, based upon certain tasks performed by the user on the user interface. For instance, to display a set of solution types for a specific business process, the generic table in the generic application server is invoked. Based upon the generic application definition available for the specific business process, a dynamic screen is created on the user interface including the dynamic screen rendering fields containing a list of solution types and associated options of selecting the solution types.

Generic application screen rendering fields may be described as a set of data fields that are associated with the set of available generic application types and the corresponding generic application types available for the solution types of a specific business process. Based upon application types and corresponding sub-application types that are invoked by the query, the generic screen rendering fields that are associated with the application types and the sub-application types are also invoked. These generic application screen rendering fields containing the application types and the sub-application types are displayed on the user interface. The generic application screen rendering fields include one or more values that may be assigned to the application types and the corresponding sub-application types by the user. These values indicate the user's input to the application types and the corresponding sub-application types.

The generic application server is also responsible for maintaining a set of generic configurable attributes for all the application types and corresponding sub-application types for the selected solution type. Based upon the retrieved application types and the corresponding sub-application types, the configurable attributes are generated by extracting one or more relevant configurable attributes from the generic table present in the generic application server. Based upon the user inputs to the application types and corresponding sub application types, the configurable attributes are configured. Metadata required for this configuration information is also stored in the generic application table.

The generic table stored in the generic application server maintains the generic tasks and generic authorizations that are available for each business processes. Generic fields and corresponding generic field types define the fields and the field-types that may be displayed on the screen. For instance, for an application type 'illness leave', a generic field 'Illness Leave' is displayed on the user interface along with a drop-down field type, showing a list of available illness leaves in the drop-down list. There may be a generic field-action associated with the generic field and the generic field type. This generic field-action allows a user to perform an action on the generic field type. For instance, if the generic field type was a check-box, the associated generic field-action allows a user to put a 'check' in the respective field. The available generic fields, generic field types and generic field-actions for the business process are stored in the generic table.

The generic table also maintains generic validity statuses, generic visibility statuses and generic accessibilities that can be used during configuring the configurable attributes. Generic validity statuses represents the available validity statuses that can be assigned to the configurable attributes, such as 'in process', 'processed' 'awaiting approval' 'approved' and the like. The generic visibility statuses represent the visibility statuses that can be assigned to the configurable attributes with reference to a role of the user. For instance, for a user with a role of a 'manager', the visibility status may be to 'read and write', and for a user with a role of a 'team member', the visibility status may be to 'read only'. Similarly, the generic accessibilities represent the accessibility options for particular information based upon the role of the user. For instance, a user with a role of a 'manager' is allowed to 'read and write' the remuneration information for each 'team member'. All these information stored in the generic table of the generic application server are stored as metadata in the business logic associated with the business process.

An example for executing a customized business process of 'reimbursement' is described herein. The business process of 'reimbursement' has the associated metadata stored in business logic. Solution types associated with 'reimbursement' are retrieved from business logic. Solution types may include 'reimbursement of travel expenses', 'reimbursement of medical expenses', and 'reimbursement of education expenses'. A user selection of a solution type, 'reimbursement of travel expenses' is selected from the user interface. Based upon 'reimbursement of travel expenses', configuration module 115 executes a query in database to retrieve a set of associated applications 'travel for training', 'business development travel', and 'home-leave travel', along with corresponding sub-application types 'length of stay', 'proof of expenses—bills', 'cash payments', 'credit-card payments', and 'required approvers'. Each of the application types and sub-application types may accept different types of inputs. For instance, sub-application type 'length of stay' may accept a user input of number of days only.

Based upon the application types and sub-application types, configuration module 115 generates configurable attributes 'number of days', 'attachments of bills', 'credit-card statements', 'approvals' and the like. Thus the business process of 'reimbursement' is customized to 'reimbursement of travel expenses' along with the associated application types, corresponding sub-application types and the configurable attributes. The user may choose to provide a user input of selecting 'business development travel' and attaching a 'bill for team dinner' to 'proof of expenses—bills'; select a radio-button option for 'cash payments'; and select 'manager' from a drop-down menu providing a list of approvers for 'required approver'. The user input is assigned to the customized business process. For instance, 'attachments of bills' is assigned 'bill for team dinner' along with a copy of the bill; and 'manager approval is assigned' 'manager approval'.

The customized business process 150 of 'reimbursement of travel' for 'business development' along with 'bill for team dinner' that was paid by cash and requires 'manager approval' for reimbursement is created. This user input to the customized business process is validated by comparing it with business logic 145 that stores the metadata of the actual business process 105. Based upon a result of comparison, the process of getting a 'reimbursement of travel' is executed in business process framework 160.

An error message that may occur in such a process may be due to a mismatch between the user input to customized business process 150 and business logic 145. For instance, according to business logic 145 for business process 105, attachments of the type '.pdf' (portable document format of Adobe Systems®) is the only attachment type that is accepted. If the user has attached files of any other file type, an error message is generated during validation.

Configuration module 115 also generates an error-correction information for such error messages based upon business logic 145. For instance, an error-correction message 'invalid attachment-file type' may appear on the user interface. Once the user changes the file type of the attachment, the attributes are reconfigured and customized business process 150 is validated and executed in business process framework 160. A 'manager' of the user may get an alert to approve such a reimbursement request, and based upon his approval, the customized business process 150 is sent to a finance department to make a reimbursement.

Another example for executing a customized business process of 'income tax declaration' is described herein. The business process 105 of 'income tax declaration' has the associated metadata stored in business logic 145. Solution types 110 associated with 'income tax declaration' are retrieved from business logic 145. Solution types 110 may include 'income tax declaration for Japan', 'income tax declaration for India', and 'income tax declaration for France'. A user selection of a solution type, 'income tax declaration for India' is selected from the user interface. Based upon 'income tax declaration for India', configuration module 115 executes a query in database 140 to retrieve a set of associated applications 120 along with corresponding sub-application types 125 as shown in 'table 1'. Each of the application types and sub-application types may accept different types of inputs, as shown in 'table 1'. Based upon the application types and sub-application types, configuration module 115 generates configurable attributes 130 shown in 'table 1'.

TABLE 1

| Application types | Corresponding sub-application types | Configurable attributes | |
|---|---|---|---|
| | | Type of attribute | Type of Input |
| Housing allowance | House rent allowance | 1. Rent agreement<br>2. Rent receipt<br>3. Amount paid | 1. Attachment (.pdf)<br>2. Attachment (.pdf)<br>3. Numeric |
| Deductions under government saving schemes | 1. Medical insurance<br>2. Life insurance<br>3. Government provident funds | 1. Medical bills<br>2. Amount paid for medicines<br>3. Dependant status<br>4. Insurance payment proof<br>5. Amount of insurance<br>6. Provident fund proof<br>7. Amount paid | 1. Attachment (.pdf)<br>2. Numeric<br>3. Drop-down menu (Mother/Father/Self/Spouse/Children)<br>4. Attachment (.pdf)<br>5. Numeric<br>6. Attachment (.pdf)<br>7. Numeric |
| Travel allowance | Leave travel allowance<br>Conveyance allowance | 1. Travel details<br>2. Travel proof<br>3. Travel expense | 1. Alpha-numeric<br>2. Attachment (.pdf)<br>3. Numeric |

Based upon the selected solution type 110, associated application types 120, corresponding sub-application types 125 and configurable attributes 130, business process 105 is customized to create customized business process 150. The user input 135 to customized business process 150 is captured. The user may choose to provide a user input of selecting an application type 'deductions under government saving schemes' and attaching a 'medical bill' (of .pdf type) for sub-application type 'medical insurance' along with an amount of bill 'INR 2500' (numeric) and a 'self' (selected from a drop-down menu) status for whom the medicines were purchased. Based upon the user inputs, the customized business process is configured. For instance, 'medical insurance' is assigned 'medical bill' along with the amount 'INR 2500' and 'self' status. The customized business process 150 of 'income tax declaration' for 'India' along with 'medical bill' of an amount 'INR 2500' for 'self' is created. The user input to the customized business process is validated by comparing it with business logic 145 that stores the metadata of the actual business process 105. Based upon a result of comparison, the process of 'income tax declaration' is executed in business process framework 160.

An error message that may occur in such a process may be due to a mismatch between customized business process 150 and business logic 145. For instance, according to business logic 145 for business process 105, the amount for medical allowance according to 'income tax declaration in India' is only 'INR 2000'. Since the user has declared 'INR 2500', an error message is generated during validation. Configuration module 115 also generates an error-correction information for such error messages based upon business logic 145. For instance, an error-correction message 'medical allowance limit is INR 2000' may appear on the user interface. Once the user changes the amount and the corresponding attachments, the attributes are reconfigured and the business process of 'income tax declaration' is customized. Customized business process 150 is validated and executed in business process framework 160.

Figure 2A:
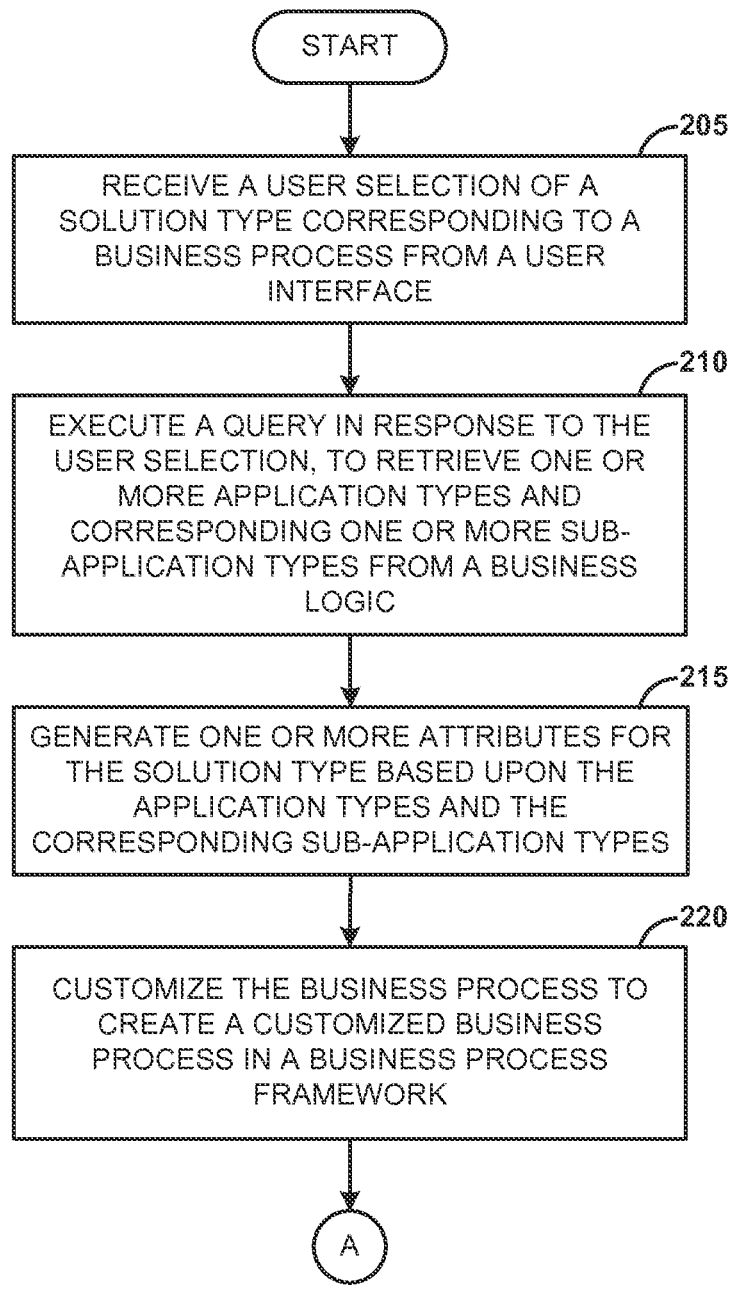
FIG. 2A is a flow diagram illustrating a method for executing a customized business process in a business process framework, according to an embodiment.

FIG. 2A is a flow diagram illustrating a method for executing a customized business process in a business process framework, according to an embodiment. In process block 205, to customize the business process, a user selection of a solution type corresponding to a business process is received from a user interface. In response to the user selection, in process block 210, a query is executed to retrieve one or more application types and corresponding one or more sub-application types from a business logic associated with the business process. Based upon the application types and the corresponding sub-application types, one or more configurable attributes are generated for the solution type at process block 215. In process block 220, the business process is customized based upon the application types, the corresponding sub-application types and the configurable attributes to create a customized business process in a business process framework. The customized business process now includes a solution type selected by the user, a set of application types and corresponding sub-application types associated with the selected solution type, a set of configurable attributes associated with the application types and the corresponding sub-application types and the configurable attributes.

Figure 2B:
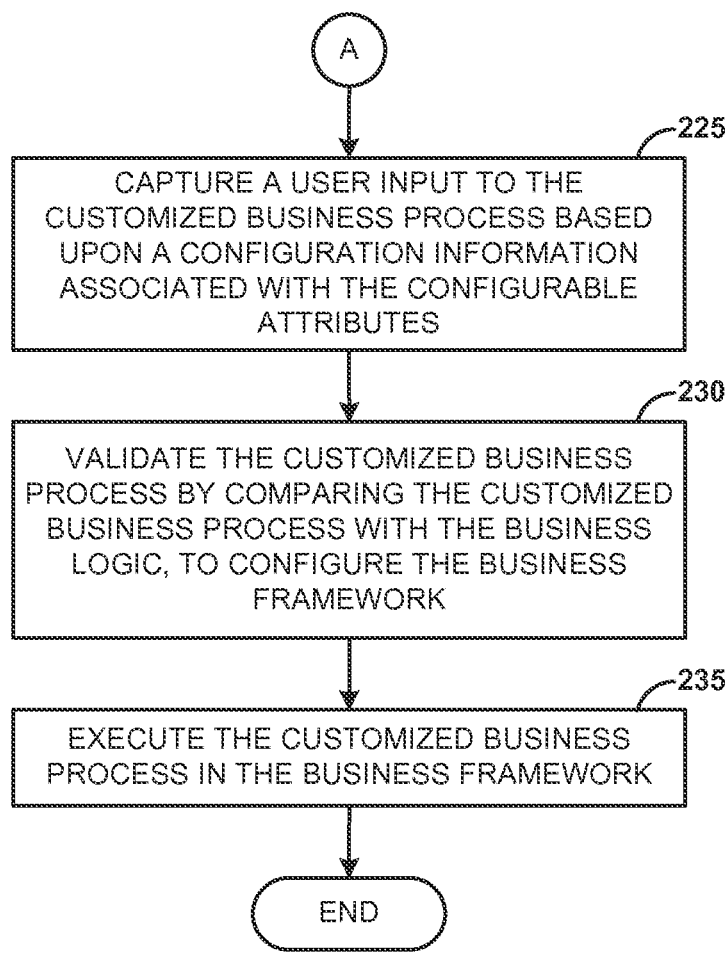
FIG. 2B is a flow diagram illustrating a validation process and an execution process of a customized business process framework, according to an embodiment.

FIG. 2B is a flow diagram illustrating a validation process and an execution process for a business process framework, according to an embodiment. The method of capturing a user input is similar to the method described in FIG. 2A. In process block 225, based upon a configuration information associated with the configurable attributes, a user input to the customized business process is captured from the user interface. In process block 230, the user input to the customized business process is validated to configure the business process framework. The validation is carried out by comparing the contents of the customized business process with the business logic. In process block 235, the customized business process that is validated to configure the business process framework is further executed in the business process framework.

Figure 3:
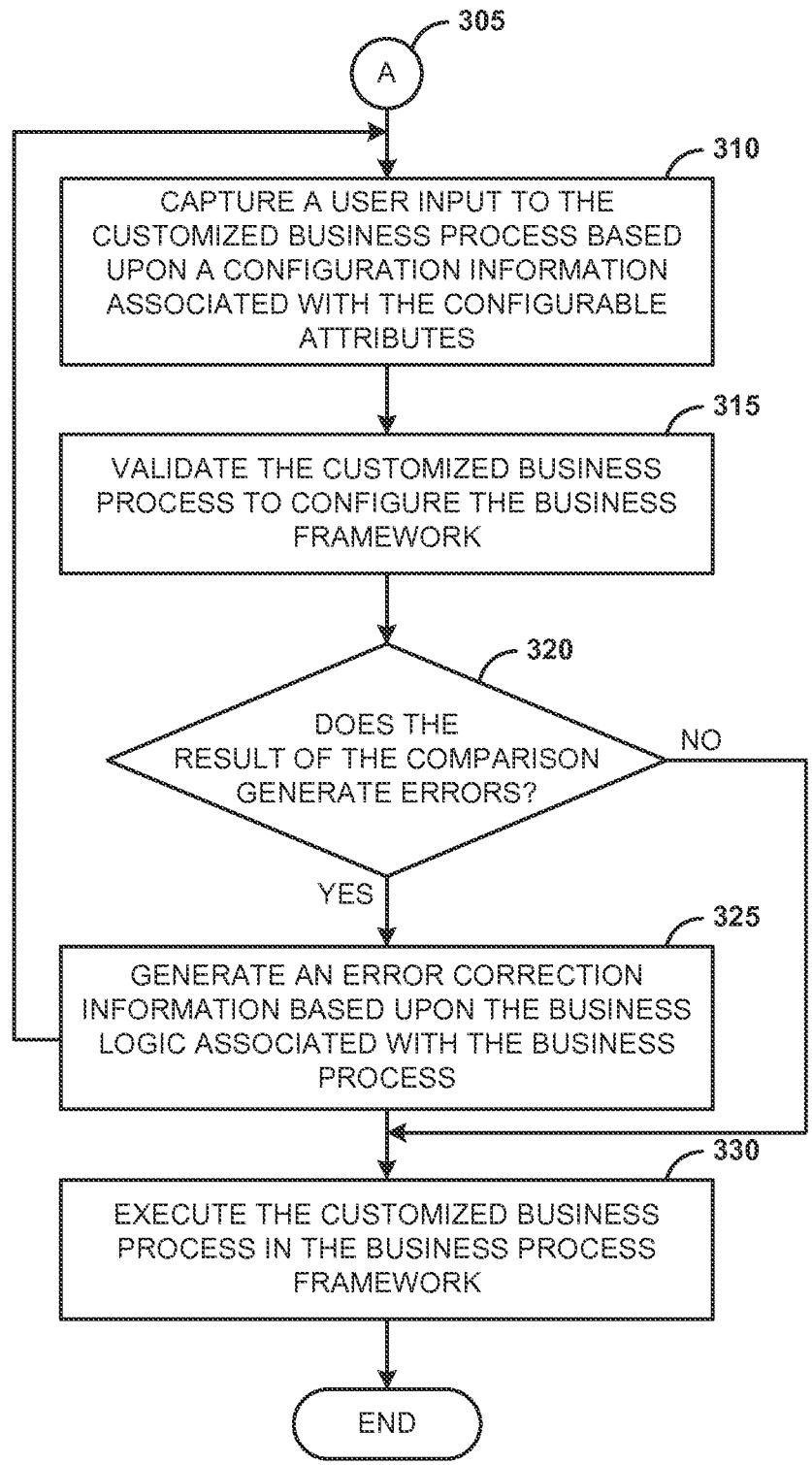
FIG. 3 is a flow diagram illustrating an occurrence of an error message during a validation process of executing a customized business process in a business process framework, according to an embodiment.

FIG. 3 is a flow diagram illustrating an occurrence of an error message during a validation process of executing a customized business process in a business process framework, according to an embodiment. Reference block 'A' 305 represents the steps carried out from process block 205—process block 220 in FIG. 2A. The process of occurrence of an error message begins from process block 310. In process block 310, based upon a configuration information associated with the configurable attributes, a user input to the customized business process is captured from the user interface. In process block 315, the user input to the customized business process is validated to configure the business process framework. The user input to the customized business process is compared with the business logic associated with the business process, and based upon a result of the comparison the customized business process is validated. If the result of the comparison generates errors at decision block 320, the process proceeds to process block 325. In process block 325, an error-correction information is generated based upon the business logic associated with the business process. Based upon the error-correction information, the configurable attributes may be reconfigured in process block 310.

If the result of comparison does not generate errors at decision block 320, the process proceeds to process block 330 where the customized business process is executed in the business process framework.

Figure 4:
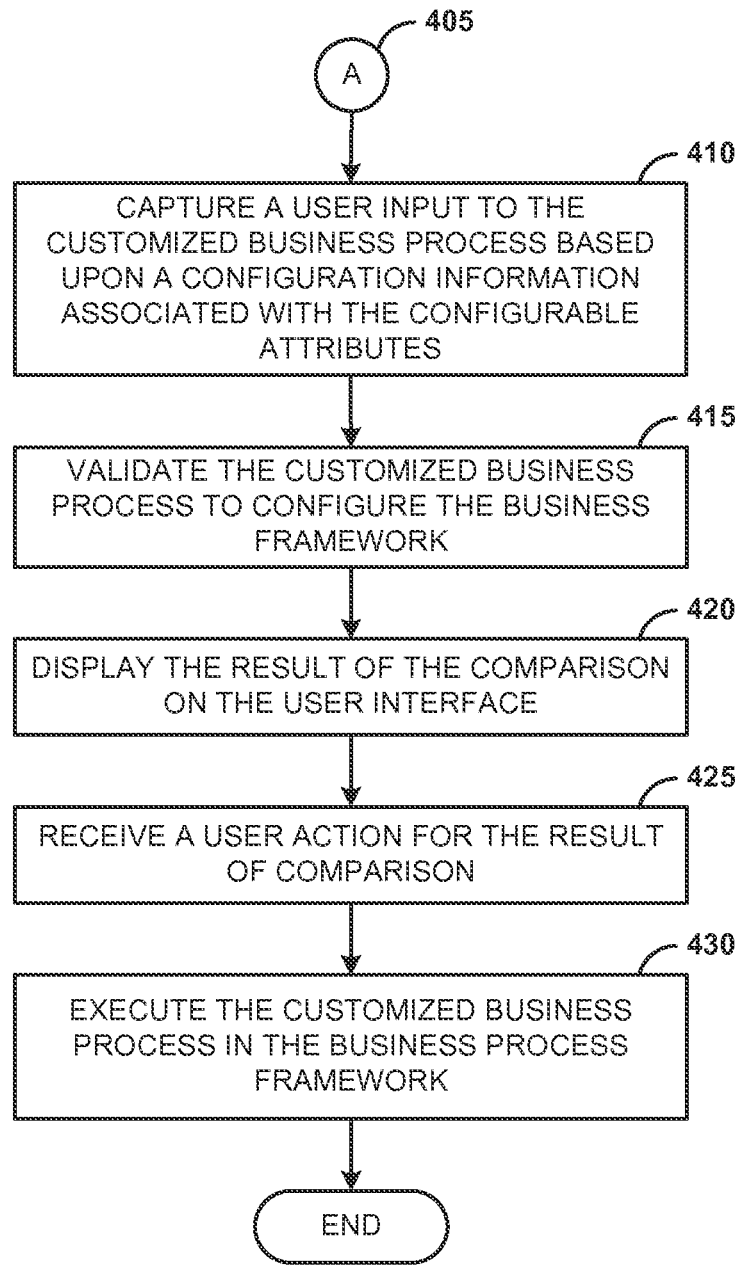
FIG. 4 is a flow diagram illustrating an approval-requisition step during validation process of executing a customized business process in a business process framework, according to an embodiment.

FIG. 4 is a flow diagram illustrating an approval-requisition step during validation process of executing a customized business process in a business process framework, according to an embodiment. Reference block 'A' 405 represents the steps carried out from process block 205—process block 220 in FIG. 2A. The approval-requisition step begins from process block 410. In process block 410, based upon a configuration information associated with the configurable attributes, a user input to the customized business process is captured from the user interface. In process block 415, the user input to the customized business process is validated to configure the business process framework. The user input to the customized business process is compared with the business logic associated with the business process, and based upon a result of the comparison the customized business process is validated.

In process block 420, the result of the comparison is displayed on the user interface. In process block 425, a user action is received for the result of comparison. The user action may include an approval of the result of comparison, a rejection of the result of comparison and a subsequent correction in the application types, the corresponding sub-application types or the configured configurable attributes, a modification in the configured configurable attributes, a validation action or an invalidation action. Based upon the user action, the user input to the customized business process that is validated to configure the business process framework is further executed in the business process framework at process block 430. In an embodiment, based upon the user action received at process block 425, the user input to the customized business process may be re-validated and further executed. In an embodiment, an invalidation action may lead to a deletion of one or more configured configurable attributes. Based upon such a deletion, the customized business process may be re-validated and executed.

Figure 5:
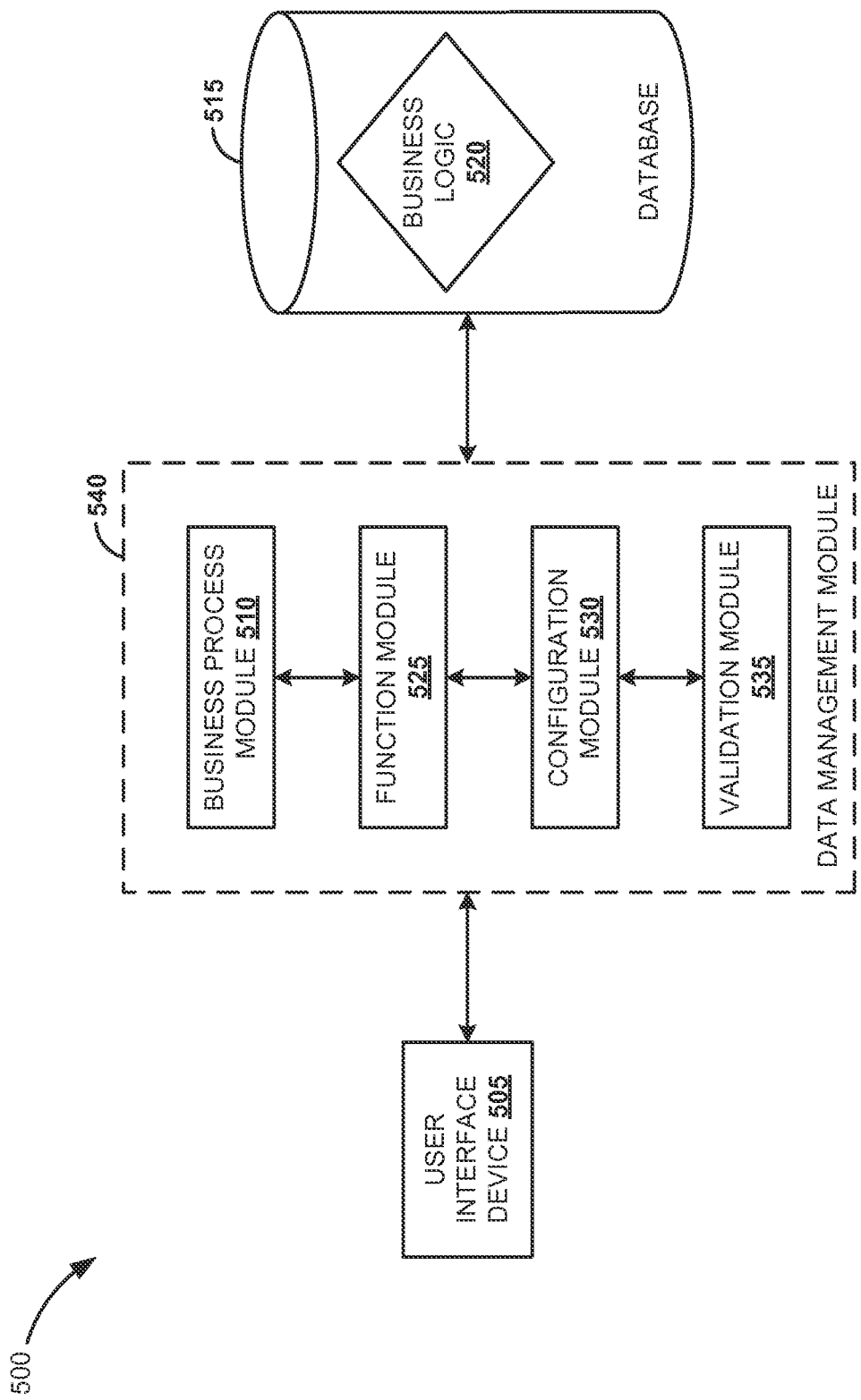
FIG. 5 is a block diagram illustrating a computer system for executing a customized business process in a business process framework, according to an embodiment.

FIG. 5 is a block diagram illustrating a computer system for executing a customized business process in a business process framework, according to an embodiment. The computer system 500 includes user interface device 505, business process module 510, database 515, business logic 520, function module 525, configuration module 530, and validation module 535. In an embodiment, user interface device 505 is coupled to business process module 510, configuration module 530 and validation module 535. Business process module 510 is coupled to function module 525 and database 515. Function module 525 is coupled to configuration module 530, validation module 535 and database 515. Configuration module 530 is coupled to validation module 535 and database 515. Validation module is coupled to database 515.

In an embodiment, user interface device 505 is configured to receive a user selection of a solution type associated with a business process. The business process includes an arrangement of a collection of inter-dependent actions with a purpose of achieving an intended result. Metadata of such business processes is stored in database 515. The metadata of the business process includes a set of solution types, a set of associated application types and a set of corresponding sub-application types. The metadata also includes a set of configurable attributes associated with the application types and the corresponding sub-application types. The metadata may also include many other details about the business process. A business process framework may be described as an adaptable collection of objects for an associated business process, which is responsible for configuring, monitoring and executing the business process. Business logic 520 includes a set of functional rules associated with the business process based upon which the metadata of the business process is exchanged between database 515 and user interface device 505. Business logic 520 includes details about the application types and corresponding sub-application types that are associated with the selected solution types. Business logic 520 is stored in database 515.

In an embodiment, business process module 510 is configured to execute a query in database 515 in response to the user selection. Based upon the query, business process module 510 retrieves one or more applications and corresponding one or more sub-application types from business logic 520 stored in database 515. Based upon these details, business process module 510 retrieves the application types and the corresponding sub-application types that are associated with the selected solution type.

In an embodiment, function module 525 is configured to generate configurable attributes for the solution type, based upon the application types and the corresponding sub-application types. A function module may be described as an interface for communicating between a server system and a client system. Function module 525 works as an interface between business logic 520 in database 515 and user interface device 505, where business logic 520 acts as a server system and user interface device 505 acts as a client system. Function module 525 facilitates business process module 510 to use the data present in business logic 520 for business transactions. In an embodiment, function module 525 calls a remote function call (RFC) to run an associated business process for user interface device 505 based upon a function-call from business logic 520. Function module 525 is used as an interface between business process module 510 and business logic 520, configuration module 530 and business logic 520, and validation module 535 and business logic 520. Based upon the application types and the corresponding sub-application types retrieved by business process module 510, function module 525 calls the remote function call to generate configurable attributes for the solution type. Configuration module 530 is configured to customize the business process based upon the selected solution type, the application types, the corresponding sub-application types and the configurable attributes.

Function module 525 is also configured to capture a user input for the customized business process from user interface device 505 based upon a configuration information associated with the configurable attributes. The user input may include a selection of a set of required configurable attributes from the generated set of configurable attributes.

In an embodiment, function module 525 configures the configurable attributes by configuring a set of tasks that have to be performed on the applications and corresponding sub-applications, authorizations for validating the customized business processes, maintaining fields and field-types for displaying on the user interface, and maintaining field actions for the fields, visibility statuses, validity statuses and accessibility options.

In an embodiment, validation module 535 is configured to validate the user input to the customized business process by comparing the user input to the customized business process with the business logic. The contents of the user input to the customized business process may be compared with the contents of the business process associated by business logic 520, and based upon a result of comparison, the customized business process is validated. Based upon this validation, the business process framework is configured by configuration module 530.

The user input and the user actions are stored as transaction data in database 515. Data management module 540 depicts the transaction of data between business process module 510, function module 525, configuration module 530 and validation module 535. Database 515 is updated with the transaction data based upon the execution of the business process. The transaction data may be tracked at specific instances of the business process in data management module 540, to provide specific status updates at the respective instances. In an embodiment, the customized business process may be invoked to update the transaction data in database 515.

In another embodiment, the result of the comparison is displayed on a user interface using user interface device 505. A user action may be received for the result of comparison on the user interface. This user action may include an approval of the result of comparison, a rejection of the result of comparison along with a subsequent correction, a modification in the configured configurable attributes, a validation action or an invalidation action. User interface device 505 communicates the user action through function module 525 to business logic 520. Based upon an associated system action corresponding to the user action, the customized business process that is validated to configure the business process framework is further executed in the business process framework.

In another embodiment, the result of comparison may generate an error message. The error message may be generated due to a mismatch in the information contained in the business process and the information contained in the user input to the customized business process. Based upon an error message generation, validation module 535 calls the remote function call to retrieve an error-correction information from business logic 520. Based upon the error-correction information, the configurable attributes may be reconfigured by configuration module 530. Based upon the reconfigured configurable attributes, the business process is customized by configuration module 530. Validation module 535 validates the user input to the customized business process to configure the business framework.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
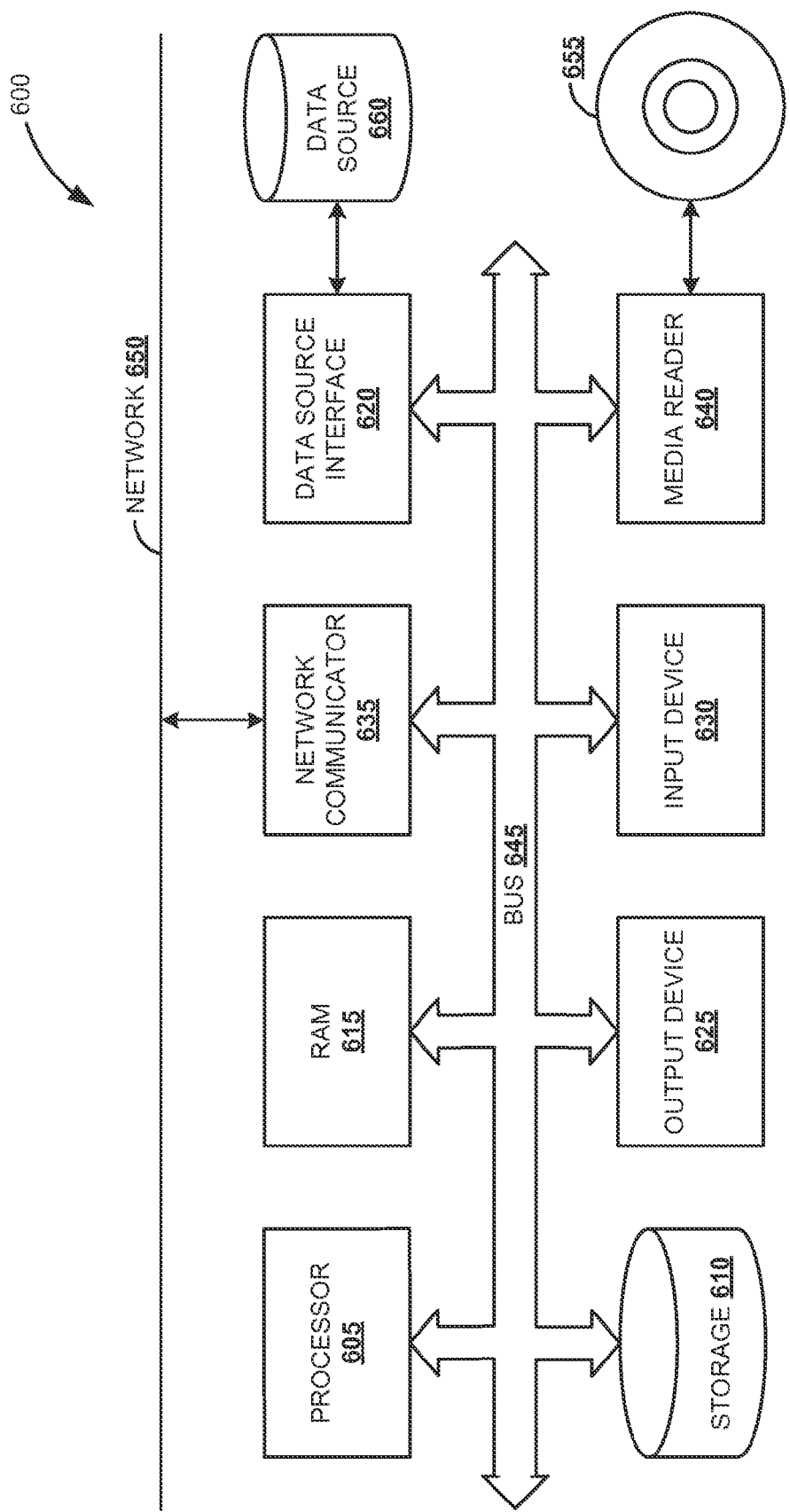
FIG. 6 is a block diagram illustrating an exemplary computer system, according to an embodiment.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, all of the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transaction, hierarchical, multi-dimensional (e.g., OLAP), object oriented databases, and the like. Further data sources include tabular data (e.g., spreadsheets, delimited text files), data tagged with a markup language (e.g., XML data), transaction data, unstructured data (e.g., text files, screen scrapings), hierarchical data (e.g. data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to execute a customized business process in a business process framework, comprising:
   from a user interface, receiving a selection of a solution type corresponding to a business process;
   in response to the selection, a processor of a computer executing a query to retrieve one or more application types and corresponding one or more sub-application types from a business logic associated with the business process;
   based upon the application types and the corresponding sub-application types, generating configurable attributes for the solution type;
   based upon the application types, the corresponding sub-application types and the configurable attributes, customizing the business process to create a customized business process in the business process framework;
   based upon a configuration information associated with the configurable attributes including actions to be performed on the application types and the corresponding sub-application types, capturing an input to the customized business process from the user interface, the associated configuration information being stored in the business logic;
   the processor validating the customized business process by comparing the input to customized business process with the business logic, and identifying a successful-comparison result based upon the comparison to configure the business process framework;
   based on the validation, generating an error message and an error-correction information as a result of comparison;
   based on the error-correction information, reconfiguring the configurable attributes to customize the business process; and
   executing the customized business process in the business process framework.

2. The computer implemented method of claim 1, wherein a database stores the business logic and a metadata of the business process.

3. The computer implemented method of claim 1 further comprising:
   displaying the error message from the user interface.

4. The computer implemented method of claim 3, wherein the error-correction information is displayed to a user, based upon a role of the user.

5. The computer implemented method of claim 1 further comprising:
   sending one or more user actions for the customized business process, based upon the validation.

6. The computer implemented method of claim 5, further comprising:
   configuring the configurable attributes to send an alert for the user actions.

7. The computer implemented method of claim 5, wherein the user actions are selected from a group consisting:
   an approval user action, a rejection user action, a modification user action, a validation user action, and an invalidation user action.

8. The computer implemented method of claim 1, further comprising:
   storing the input to the application types, the corresponding sub-application types, and the configured configurable attributes as a transaction data in the database; and
   updating the database with the transaction data upon execution of the business process.

9. The computer implemented method of claim 8, further comprising: tracking the transaction data at one or more specific instances of the business process to provide one or more specific status updates to the user.

10. The computer implemented method of claim 8, further comprising: invoking the customized business process to update the corresponding transaction data in the database.

11. The computer implemented method of claim 1, further comprising: mapping the application types and the corresponding sub-application types, based upon a hierarchy in the business process.

12. The computer implemented method of claim 11, wherein the hierarchy comprises one or more multiple levels of the application types and the corresponding sub-application types based upon a priority of the application types and the corresponding sub-application types.

13. The computer implemented method of claim 12, further comprising: sending a notification to invite participation to involve one or more users at the hierarchy in the business process.

14. The computer implemented method of claim 1, wherein the input is selected from a group consisting of:
  configuring one or more tasks to be performed on the application types and the corresponding sub-application types;
  configuring one or more authorizations for validating the customized business processes;
  configuring one or more fields and corresponding one or more field-types for displaying on the user interface;
  configuring one or more field-user actions for the fields;
  configuring a validity status of the fields;
  configuring a visibility status of the fields; and
  configuring one or more accessibilities for the application types and the corresponding sub-application types.

15. The computer implemented method of claim 1 further comprising: configuring the business logic associated with the business process to:
  define one or more generic application definitions and one or more associated generic application types and corresponding generic sub-application types;
  define one or more dynamic screen rendering fields, one or more associated generic application screen rendering fields, and one or more values for the associated generic application screen rendering fields;
  maintain one or more generic configurable attributes for the generic application types and the corresponding generic sub-application types; and
  maintain one or more generic tasks, one or more generic authorizations, one or more generic fields and corresponding generic field types, one or more generic field-actions, one or more generic validity statuses, one or more generic visibility statuses, and one or more generic accessibilities.

16. An article of manufacture including a non-transitory computer readable storage medium to tangibly store instructions, which when executed by a computer, cause the computer to:
  receive a user selection of a solution type corresponding to a business process, from a user interface;
  execute a query in response to the user selection, to retrieve one or more application types and corresponding one or more sub-application types from a business logic associated with the business process, wherein the business logic is stored in a database;
  generate one or more configurable attributes for the solution type based upon the application types and the corresponding sub-application types;
  customize the business process based upon the application types, the corresponding sub-application types and the configurable attributes to create a customized business process in a business process framework;
  based upon a configuration information associated with the configurable attributes including actions to be performed on the application types and the corresponding sub-application types, capture an input to the customized business process from the user interface, the associated configuration information stored in the business logic;
  validate the input to the customized business process by comparing the input to customize the business process with the business logic, and identifying a successful-comparison result based upon comparison;
  based on the validation, generate an error message and an error-correction information as a result of comparison;
  based on the error-correction information, reconfigure the configurable attributes to customize the business process; and
  execute the customized business process in the business process framework.

17. A computer system for configuring a business process framework to execute a customized business process, comprising:
  one or more memory elements for storing instructions;
  a processor operable for reading and executing instructions stored in the one or more memory elements;
  from a user interface device, receive a selection of a solution type corresponding to a business process;
  in response to the selection, execute a query to retrieve one or more application types and corresponding one or more sub-application types from a business logic component associated with the business process, stored in the database;
  generate configurable attributes for the solution type based upon the application types and the corresponding sub-application types;
  customize the business process based upon the input to the application types and the corresponding sub-application types, and the configured configurable attributes; and
  capture an input to the customized business process from the user interface device based upon a configuration information associated with the configurable attributes including actions to be performed on the application types and the corresponding sub-application types;
  validate the customized business process by comparing the input to the customized business process with the business logic and identifying a successful-comparison result based upon comparison, for configuring the business process framework;
  based on the validation, generate an error message and an error-correction information as a result of comparison;
  based on the error-correction information, reconfigure the configurable attributes to customize the business process; and
  execute the customized business process in the business process framework.

18. The computer system of claim 17, wherein the processor further executes the instructions to: maintain a transaction of data between a business process module, a function module, a configuration module and a validation module; and update the database with the transaction of data based upon the input to the application types and the corresponding sub-application types, and the configured configurable attributes.

19. The computer system of claim 17, wherein the processor further executes the instructions to: configure one or more tasks to be performed on the application types and the corresponding sub-application types;

configure one or more authorizations for validating the customized business processes;

configure one or more fields and corresponding one or more field-types for displaying on the user interface;

configure one or more field-user actions for the fields;

configure a validity status of the fields;

configure a visibility status of the fields; and configure one or more accessibilities for the application types and the corresponding sub-application types.

20. The computer system of claim 17, wherein the business logic is configured to:

define one or more generic application definitions and one or more associated generic application types and corresponding generic sub-application types;

define one or more dynamic screen rendering fields, one or more associated generic application screen rendering fields, and one or more values for the associated generic application screen rendering fields;

maintain one or more generic configurable attributes for the generic application types and the corresponding generic sub-application types; and maintain one or more generic tasks, one or more generic authorizations, one or more generic fields and corresponding generic field types, one or more generic field-actions, one or more generic validity statuses, one or more generic visibility statuses, and one or more generic accessibilities.

\* \* \* \* \*